US010097912B2

(12) United States Patent
Anderson et al.

(10) Patent No.: US 10,097,912 B2
(45) Date of Patent: Oct. 9, 2018

(54) INTELLIGENT SWITCHING BETWEEN AIR CONDUCTION SPEAKERS AND TISSUE CONDUCTION SPEAKERS

(71) Applicant: Intel Corporation, Santa Clara, CA (US)

(72) Inventors: Glen J. Anderson, Beaverton, OR (US); Ryan S. Brotman, Mesa, AZ (US); Giuseppe Raffa, Portland, OR (US); John C. Weast, Portland, OR (US); Daniel S. Lake, Hillsboro, OR (US); Deepak S. Vembar, Portland, OR (US); Lenitra M. Durham, Beaverton, OR (US); Brad Jackson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 14/671,645

(22) Filed: Mar. 27, 2015

(65) Prior Publication Data

US 2016/0286299 A1 Sep. 29, 2016

(51) Int. Cl.
*H02B 1/00* (2006.01)
*H04R 1/10* (2006.01)
*H04R 25/00* (2006.01)

(52) U.S. Cl.
CPC ........... *H04R 1/1016* (2013.01); *H04R 25/55* (2013.01); *H04R 25/606* (2013.01); *H04R 2460/13* (2013.01)

(58) Field of Classification Search
CPC .... H04R 1/1016; H04R 1/1041; H04R 25/00; H04R 25/30; H04R 25/70; H04R 2460/13; H04R 2225/61; A61F 11/008
(Continued)

(56) References Cited

U.S. PATENT DOCUMENTS 8,831,244 B2 * 9/2014 Apfel .................. H03G 3/3089 381/101
8,842,848 B2 * 9/2014 Donaldson ........... H04R 1/1083 381/71.6

(Continued)

FOREIGN PATENT DOCUMENTS

KR 10-2015-0003555 A 1/2015

OTHER PUBLICATIONS

Tran et al., "The Effect of Bone Conduction Microphone Placement on Intensity of Spectrum of Transmitted Speech Items", The Journal of the Acoustical Society of America, 133(6), Jun. 2013, pp. 3900-3908.

(Continued)

*Primary Examiner* — William A Jerez Lora
(74) *Attorney, Agent, or Firm* — Jordan IP Law, LLC

(57) ABSTRACT

Systems and methods may provide for determining a usage configuration of a wearable device and setting an activation state of an air conduction speaker of the wearable device based at least in part on the usage configuration. Additionally, an activation state of a tissue conduction speaker of the wearable device may be set based at least in part on the usage configuration. In one example, the usage configuration is determined based on a set of status signals that indicate one or more of a physical position, a physical activity, a current activation state, an interpersonal proximity state or a manual user request associated with one or more of the air conduction speaker or the tissue conduction speaker.

22 Claims, 3 Drawing Sheets

(58) Field of Classification Search
USPC ......... 381/23.1, 60, 123, 124, 312, 325, 380
See application file for complete search history.

(56) References Cited

U.S. PATENT DOCUMENTS

| | | | | |
|---|---|---|---|---|
| 2008/0089530 | A1* | 4/2008 | Bostick .................... | H03G 3/32 381/74 |
| 2008/0112581 | A1 | 5/2008 | Kim et al. | |
| 2010/0020982 | A1 | 1/2010 | Brown et al. | |
| 2011/0208520 | A1 | 8/2011 | Lee | |
| 2011/0222701 | A1* | 9/2011 | Donaldson ........... | H04R 1/1083 381/74 |
| 2011/0301729 | A1* | 12/2011 | Heiman .................. | H04S 7/301 700/94 |
| 2013/0301860 | A1 | 11/2013 | Neumeyer et al. | |
| 2014/0146976 | A1* | 5/2014 | Rundle ................ | H04R 1/1083 381/71.6 |
| 2014/0364171 | A1* | 12/2014 | Heiman ................ | H04M 1/605 455/566 |
| 2015/0222977 | A1* | 8/2015 | Angel, Jr. .............. | H04R 1/105 381/74 |

OTHER PUBLICATIONS

Walker et al., "High Fidelity Modeling and Experimental Evaluation of Binaural Bone Conduction Communication Devices", In 19th Int. Congress on Acoustics, Madrid Spain, Sep. 2007, 6 pages.
Walker et al., "Thresholds of Audibility for Bone-Conduction headsets", Proceedings of ICAD 11th Int. Conference on Auditory Display, Limerick Ireland, Jul. 2005, pp. 218-222.
International Search Report and Written Opinion for International Patent Application No. PCT/US2016/017054, dated May 16, 2016, 11 pages.
International Preliminary Report on Patentability for International Application No. PCT/US2016/017054 dated Oct. 12, 2017, 8 pages.

* cited by examiner

INTELLIGENT SWITCHING BETWEEN AIR CONDUCTION SPEAKERS AND TISSUE CONDUCTION SPEAKERS

TECHNICAL FIELD

Embodiments generally relate to the use of a combination of air conduction speakers and tissue conduction speakers in wearable devices. More particularly, embodiments relate to intelligent switching between air conduction speakers and tissue conduction speakers.

BACKGROUND

Headsets may be used to listen to music, conduct telephone conversations, and so forth. Traditional headsets may have air conduction speakers that deliver sound waves to the open space within the ear canal. Accordingly, the wearer may either insert ear buds into the ear canal or place "ear cans" on or over the ear. Such a configuration, however, may be unsuitable for other wearable device form factors such as, for example, hats or eyewear. Bone conduction speakers, on the other hand, may deliver sound waves directly to parts of the skull. While bone conduction speakers may be more appropriate for various wearable form factors, there remains considerable room for improvement. For example, wearable devices containing only bone conduction speakers may be subject to poor sound quality and/or noise cancellation.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
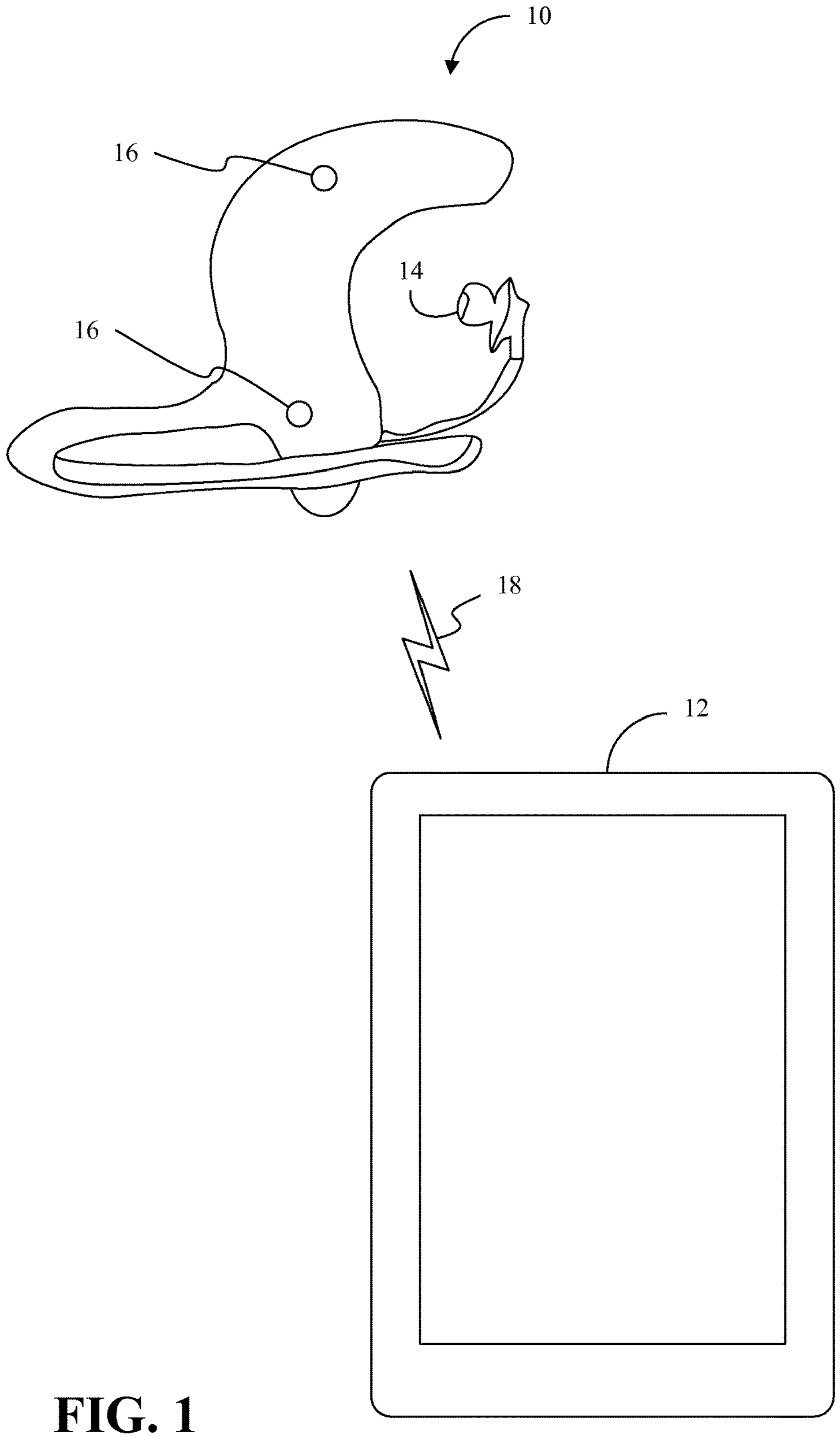
FIG. 1 is an illustration of an example of a wearable device containing both an air conduction speaker and a tissue conduction speaker according to an embodiment.

Turning now to FIG. 1, a wearable device 10 is shown. The wearable device 10 may generally be used to deliver audio signals 18 such as, for example, music content, telephone conversation content, and so forth, to a user of the wearable device 10. The audio signals 18 may be obtained from a remote device 12 (e.g., smart phone, notebook computer, tablet computer, convertible tablet, mobile Internet device/MID, personal digital assistant/PDA, desktop computer, media player, etc.), internally from the wearable device 10 and/or directly from the ambient environment. Although the illustrated wearable device 10 includes an ear bud headset form factor, other form factors such as, for example, ear can headsets, hats, eyewear, hearing aids, etc., may also be used.

The wearable device 10 may include one or more air conduction speakers 14 as well as one or more tissue conduction speakers 16. The air conduction speakers 14 may be configured to deliver sound waves to the open space of the ear canal of the user, whereas the tissue conduction speakers 16 may be configured to the deliver sound waves directly to the skull of the user. Thus, the air conduction speakers 14 may transmit most of the emitted sound through the ear canal to the tympanic membrane (ear drum) to vibrate the bones of the middle ear, which may then stimulate the choclea. The tissue conduction speakers 16, on the other hand, may transmit sound primarily through contact with the skin, which allows sound to be conducted though bone or soft-tissues to the inner ear to stimulate the choclea more directly. Although, the air conduction speakers 14 may also cause sound to be transmitted through tissue (i.e., bypassing the outer and middle ear) to some degree, the primary mode of conduction is via the ear canal, tympanic membrane, and middle ear bones. Likewise, the tissue conduction speakers 16 may transmit some sound waves through the ear canal, but they are primarily designed to optimize the transmission of sound through tissue more effectively than the illustrated air conduction speakers 14.

As will be discussed in greater detail, the wearable device 10 may determine the usage configuration (e.g., context) of the wearable device 10 and automatically set the activation states and/or optimization states of the air conduction speakers 14 and the tissue conduction speakers 16 based on the usage configuration. Such an approach may enable the wearable device 10 to intelligently operate itself in an optimal state relative to the context in which it is being used. As a result, the illustrated wearable device 10 obviates privacy concerns, improves sound quality and/or noise cancellation, and ultimately leads to an enhanced user experience. In some embodiments the air conduction speakers 14 may be placed in the environment, while the tissue conduction speakers 16 are worn on the body.

Figure 2:
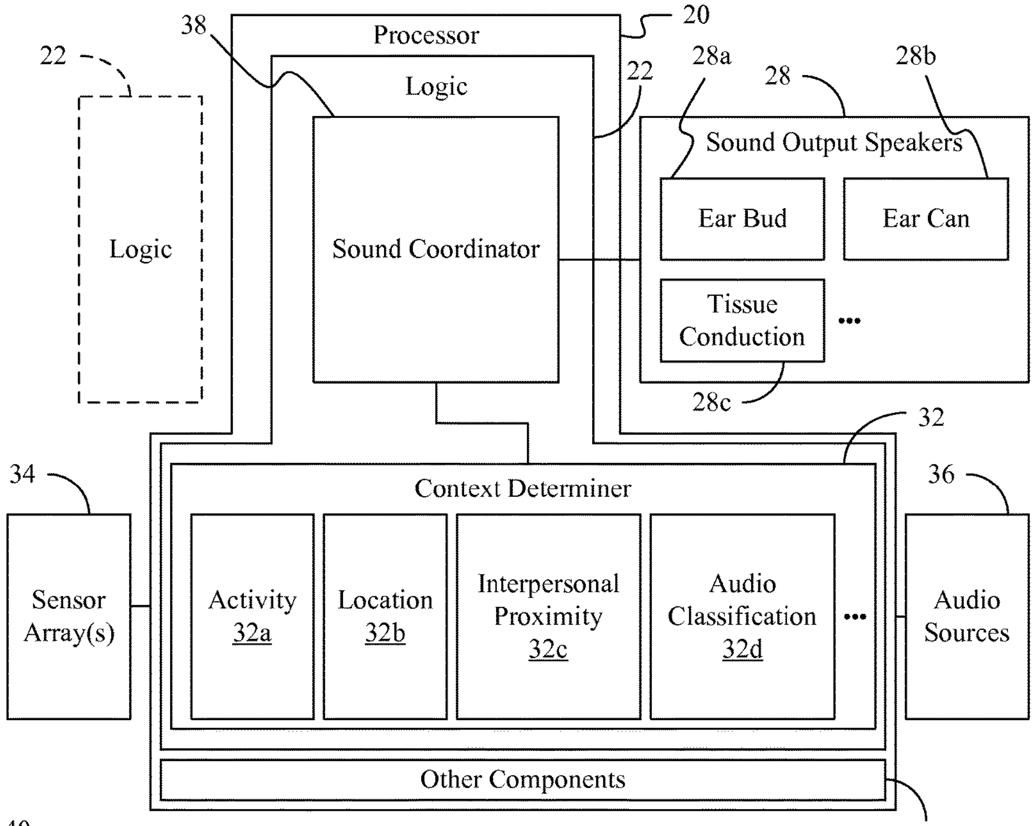
FIG. 2 is a block diagram of an example of a logic architecture according to an embodiment.

FIG. 2 shows a processor 20 including a logic architecture 22 and a set of hybrid sound output speakers 28 (28*a*-28*c*) including ear bud speakers 28*a*, ear can speakers 28*b*, and tissue conduction speakers 28*c*, wherein the ear bud speakers 28*a* and the ear can speakers 28*b* may be considered air conduction speakers. The processor 20 may generally be incorporated into a wearable device such as, for example, the wearable device 10 (FIG. 1) and/or a remote device such as, for example, the remote device 12, already discussed. The logic architecture 22 may also be implemented externally to the processor 20, which may include various other components 30 (e.g., interface controllers, caches, etc.).

In the illustrated example, the logic architecture 22 includes a context determiner 32 (32*a*-32*d*) that determines the usage configuration of the wearable device. The context determiner 32 may generally determine the usage configuration based on a set of status signals from a sensor array 34 (e.g., including one or more motion sensors, location sensors, pressure sensors, proximity sensors, biometric sensors, capacitive touch sensors, microphones, etc.) and/or an audio signal from one or more audio sources 36 (e.g., media player, network controller, mass storage, flash memory), or as an explicit setting by the user. More particularly, the illustrated context determiner 32 includes an activity component 32*a* that identifies a physical activity (e.g., running, walking, sleeping) associated with the wearable device based on one or more status signals from the sensor array 34. Additionally, a location component 32*b* may identify a physical location (e.g., in-ear, on-ear, out-of-ear, off-of-ear) associated with the wearable device based one or more of the status signals. Thus, the location component 32*b* might obtain the status signals from pressure sensors embedded in the ear bud speakers 28*a* and/or a microphone embedded within the ear can speakers 28*b* and determine whether the user is currently wearing the ear bud speakers 28*a* and/or the ear can speakers 28*b*. An interpersonal proximity component 32*c* may identify an interpersonal proximity state (e.g., near other individuals/devices, alone) associated with the wearable device based on one or more of the status signals.

The context determiner 32 may also determine other aspects of the usage configuration such as, for example, the current activation state of the sound output speakers 28, the occurrence of a manual user request (e.g., via a capacitive touch sensor), and so forth, based on the status signals from the sensor array 34. The illustrated context determiner 32 also includes an audio classification component 32*d* that determines one or more attributes of the audio signal to be delivered via the sound output speakers 28. The attributes might include, for example, frequency distribution information (e.g., music content identifiers, voice content identifiers, source identifiers, etc.), volume information, timing information, and so forth. The context determiner 32 may also include additional and/or different components in order to make the context determination. The logic architecture 22 may also include a sound coordinator 38 that automatically sets the activation states of the sound output speakers 28 based on the usage configuration information from the context determiner 32. For example, the sound coordinator 38 might activate the tissue conduction speakers 28*c* and deactivate the ear bud speakers 28*a* and the ear can speakers 28*b* when the usage configuration information indicates that the user of the wearable device is cycling while listening to music (e.g., in order to enable the user to more effectively hear traffic sounds in the ambient environment while still listening to music). Alternatively, the sound coordinator 38 may deactivate all of the sound output speakers 28 when the usage configuration information indicates that the user of the wearable device has started a face-to-face conversation with a nearby individual (e.g., based on a status signal from an outward facing microphone).

The sound coordinator 38 may also set optimization states of the sound output speakers 28 based on the usage configuration information. The optimization states might include, for example, a music-specific optimization state, a voice-specific optimization state, and so forth. For example, the tissue conduction speakers 28*c* might not be ideal for listening to music (e.g., lower frequency sounds may take on a “tinny” quality). Thus, the sound coordinator 38 may place the tissue conduction speakers 28*c* in the music-specific optimization state when the usage configuration information indicates that the audio signal contains music. Such an approach may enhance musical tones in the higher frequencies so as not to compete with the full spectrum of frequencies being delivered through the ear bud speakers 28*a* or the ear can speakers 28*b*. On the other hand, the sound coordinator 38 might place the tissue conduction speakers 28*c* in the voice-specific optimization state (e.g., enhancing voice frequencies) when the usage configuration information indicates that the audio signal contains voice content (e.g., a telephone call is ongoing).

The sound coordinator 38 and/or context determiner 32 may also take into consideration other conditions such as, for example, power conditions and/or ambient noise conditions. For example, the sound coordinator 38 and/or context determiner 32 might automatically switch to a lower power speaker when a low battery power condition is detected. Additionally, the sound coordinator 38 and/or context determiner 32 may switch to using an air conduction speaker when a high ambient noise condition is detected. In another example, the logic architecture 22 may create ad-hoc “distortion” in the audio signal (e.g., voice content from a phone call) depending on the ambient noise level and distribute the distortion to the mixed system of sound output speakers 28. For example, if the ambient noise is in the low frequencies, the logic architecture 22 might increase the pitch of the sound (e.g., without causing any distortion in its temporal characteristics—i.e., pitch shifting) and deliver the modified audio signal to the tissue conduction speakers 28*c*, which may be more suitable for relatively high frequency sounds. Given that the pitch may be different depending on the person speaking and the communication channel, the logic architecture 22 may choose the best way to acoustically render a voice. In this regard, ambient noise may be detected via a microphone in the sensor array 34 and/or an inverted ear can speaker 28*b* (e.g., pointed outward) that is repurposed as a microphone. The inverted ear can speaker 28*b* may obviate any need for a separate microphone while providing noise leveling for the tissue conduction speaker 28*c*.

The logic architecture 22 may also create 3D (three dimensional) and/or spatial effects through audio and vibration by leveraging the spatial distance and human perception of sounds. Moreover, different physical embodiments may be made to enhance this feature (e.g., tissue conducting in different parts of the skull). In another example, when the user is wearing the hybrid sound output speakers 28, the tissue conduction speakers 28*c* may be used to deliver alerts or other notifications (e.g., text messages, calendar reminders) on top of other music or voice conversation content that is delivered via the air conduction speakers. Such an approach may provide less interference and annoyance to the user. Indeed, application developers may independently target the air conduction speakers and the tissue conduction speakers 28*c* in order to create new auditory experiences that have different physiological effects on the user depending on which speakers are used to deliver the sound. Below is a set of tables including: Table I showing examples in which music is playable on both air conduction and tissue conduction speakers; Table II showing examples in which music is playable only on air conduction speakers; and Table III showing examples in which music is playable on both air conduction and tissue conduction speakers and manual user requests are enabled.

TABLE I

| Initial Configuration | User Context (e.g., activity, location, social, facilities) | Starting Context | Intelligent Switching Result |
|---|---|---|---|
| air speakers removed<br>tissue speakers mounted<br>tissue speakers off<br>air speakers off | biking alone | music | tissue speakers on<br>air speakers off |
| air speakers removed<br>tissue speakers mounted<br>tissue speakers on<br>air speakers on | in conversation | music | tissue speakers off<br>air speakers off |
| air speakers mounted<br>tissue speakers mounted<br>tissue speakers off<br>air speakers off | sitting alone | music | tissue speakers on<br>(music optimized)<br>air speakers on |

TABLE I-continued

| Initial Configuration | User Context (e.g., activity, location, social, facilities) | Starting Context | Intelligent Switching Result |
|---|---|---|---|
| air speakers mounted tissue speakers mounted tissue speakers on (music optimized) air speakers on | sitting alone | phone call | tissue speakers on (voice optimized) air speakers on |

(Music is playable on both air conduction and tissue conduction speakers)

TABLE II

| Initial Configuration | User Context (e.g., activity, location, social, facilities) | Starting Context | Intelligent Switching Result |
|---|---|---|---|
| air speakers removed tissue speakers mounted tissue speakers off air speakers off | sitting alone | music | tissue speakers off air speakers off |
| air speakers mounted tissue speakers mounted tissue speakers off air speakers off | sitting alone | music | tissue speakers off air speakers on |

(Music is playable only on air conduction speakers)

TABLE III

| Initial Configuration | User Context (e.g., activity, location, social, facilities) | Starting Context | Intelligent Switching Result |
|---|---|---|---|
| air speakers removed tissue speakers mounted tissue speakers off air speakers off | in conversation | music | tissue speakers turn on with user input (music optimized) air speakers stay off |
| air speakers mounted tissue speakers mounted tissue speakers off air speakers on, (music optimized) | sitting alone | music | tissue speakers turn on with user input air speakers stay on (music optimized) |

(Music is playable on both air conduction and tissue conduction speakers and manual user requests are enabled)

Figure 3:
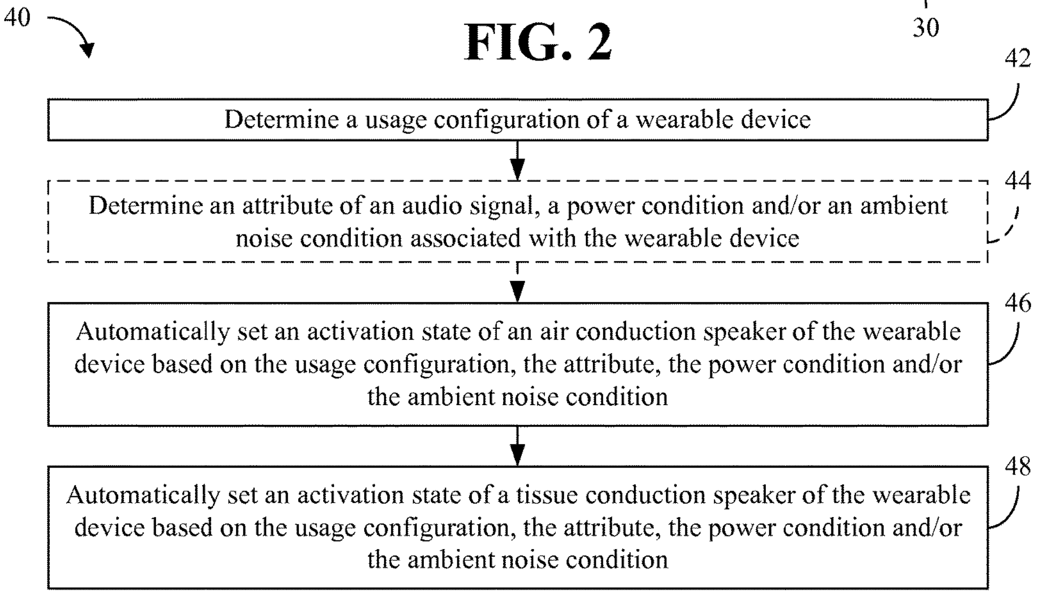
FIG. 3 is a flowchart of an example of a method of operating a wearable device according to an embodiment.

FIG. 3 shows a method 40 of operating a wearable device. The method 40 may generally be implemented in a logic architecture such as, for example, the logic architecture 22 (FIG. 2), already discussed. More particularly, the method 40 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 40 may be written in any combination of one or more programming languages, including an object oriented programming language such as JAVA, SMALLTALK, C++ or the like and conventional procedural programming languages, such as the "C" programming language or similar programming languages.

Illustrated processing block 42 provides for determining a usage configuration of the wearable device. The usage configuration may be determined based on a set of status signals that indicate, for example, a physical position, a physical activity, a current activation state, an interpersonal proximity state and/or a manual user request associated with one or more of an air conduction speaker or a tissue conduction speaker of the wearable device. Additionally, block 44 may optionally determine an attribute of an audio signal associated with the wearable device. The attribute may include frequency distribution information (e.g., music content identifiers, voice content identifiers, source identifiers, etc.), volume information, timing information, and so forth. Block 44 may also include determining power conditions and/or ambient noise conditions associated with the wearable device.

Block 46 may automatically set an activation state of the air conduction speaker of the wearable device based on one or more of the usage configuration, the audio signal attribute, the power condition or the ambient noise condition. Similarly, illustrated block 48 automatically sets the activation state of the tissue conduction speaker of the wearable device based on one or more of the usage configuration, the audio signal attribute, the power condition or the ambient noise condition. Blocks 46 and 48 may also involve setting optimization states of the air conduction speaker and/or tissue conduction speaker, wherein the optimization states may include music-specific optimization states, voice-specific optimization states, and so forth. For example, the music-specific optimization state might involve the delivery of relatively low frequency/high amplitude output (e.g., sub-100 Hz bursts with beat alignment) and the voice-specific optimization state may involve the delivery of energy in the human speech frequency range (e.g., 300 Hz to 3400 Hz). The values provided herein are to facilitate discussion only and may vary depending on the circumstances. Moreover, blocks 46 and 48 may be conducted in a different order than shown and/or in parallel.

Figure 4:
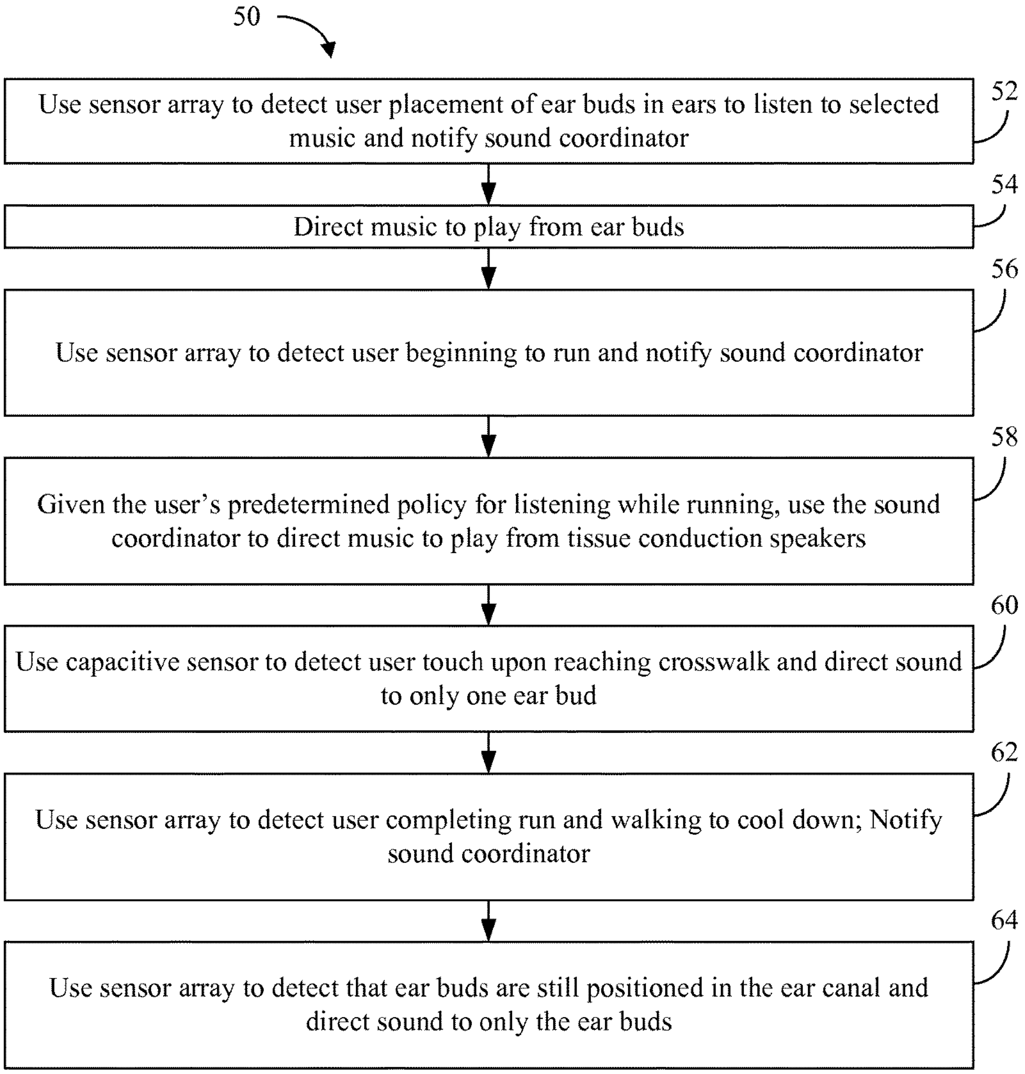
FIG. 4 is a flowchart of an example of operating a wearable device in a particular usage scenario according to an embodiment.

FIG. 4 shows a method 50 of operating a wearable device in a particular usage scenario. The method 50 may generally be implemented in a logic architecture such as, for example, the logic architecture 22 (FIG. 2), already discussed. More particularly, the method 50 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 52 uses a sensor array to detect user placement of air conduction speakers such as ear buds within the ears in order to listen to selected music. Block 52 may also notify a sound coordinator such as, for example, the sound coordinator 38 (FIG. 2) of the change in context. Illustrated block 54 directs music to play from the ear buds in response to the context change. The sensor array may be used at block 56 to detect the user beginning to run, wherein the sound coordinator may be notified of the additional change in context. If the user has a predetermined policy to be applied while running, block 58 might use the sound coordinator to direct music to play only from the tissue conduction speakers. Illustrated block 60 may also use a capacitive sensor to detect the user's touch (e.g., upon reaching a crosswalk), wherein sound may be directed to only one ear bud in response to the manual user request. The sensor array may be used at block 62 to detect the user completing the run and walking to cool down. Accordingly, block 62 may also provide for notifying the sound coordinator of the context change. If it is determined at block 64 that the ear buds are still positioned within the ear canal, sound may be directed only to the ear buds in such a scenario, or to only one ear bud. In addition, block 64 might provide for changing music optimization settings to reduce the volume of the music since the user is no longer running and may not need for the music to be as loud. Simply put, music optimization settings may also vary based on input from the sensor array and/or context determiner.

ADDITIONAL NOTES AND EXAMPLES

Example 1 may include a wearable device comprising an air conduction speaker, a tissue conduction speaker and logic, implemented in one or more of configurable logic hardware or fixed-functionality logic hardware, to determine a usage configuration of the wearable device, set an activation state of the air conduction speaker based at least in part on the usage configuration, and set an activation state of the tissue conduction speaker based at least in part on the usage configuration.

Example 2 may include the system of Example 1, further including one or more sensors, wherein the usage configuration is to be determined based on a set of status signals from the one or more sensors that indicate one or more of a physical position, a physical activity, a current activation state, an interpersonal proximity state or a manual user request associated with one or more of the air conduction speaker or the tissue conduction speaker.

Example 3 may include the system of Example 1, wherein the logic is to determine an attribute of an audio signal associated with the wearable device, wherein one or more of the activation state of the air conduction speaker or the activation state of the tissue conduction speaker are to be set further based on the attribute.

Example 4 may include the system of Example 1, wherein one or more of the activation state of the air conduction speaker or the activation state of the tissue conduction speaker are to be set further based on one or more of a power condition or an ambient noise condition associated with the wearable device.

Example 5 may include the system of any one of Examples 1 to 4, wherein the logic is to set an optimization state of the tissue conduction speaker based on the usage configuration.

Example 6 may include the system of Example 5, wherein the optimization state is to be one or more of a music-specific optimization state or a voice-specific optimization state.

Example 7 may include an apparatus to operate a wearable device, comprising logic, implemented in one or more of configurable logic hardware or fixed-functionality logic hardware, to determine a usage configuration of the wearable device, set an activation state of an air conduction speaker of the wearable device based at least in part on the usage configuration, and set an activation state of a tissue conduction speaker of the wearable device based at least in part on the usage configuration.

Example 8 may include the apparatus of Example 7, wherein the usage configuration is to be determined based on a set of status signals that indicate one or more of a physical position, a physical activity, a current activation state, an interpersonal proximity state or a manual user request associated with one or more of the air conduction speaker or the tissue conduction speaker.

Example 9 may include the apparatus of Example 8, wherein the logic is to determine an attribute of an audio signal associated with the wearable device, wherein one or more of the activation state of the air conduction speaker or the activation state of the tissue conduction speaker are to be set further based on the attribute.

Example 10 may include the apparatus of Example 8, wherein one or more of the activation state of the air conduction speaker or the activation state of the tissue conduction speaker are to be set further based on one or more of a power condition or an ambient noise condition associated with the wearable device.

Example 11 may include the apparatus of any one of Examples 8 to 10, wherein the logic is to set an optimization state of the tissue conduction speaker based on the usage configuration.

Example 12 may include the apparatus of Example 11, wherein the optimization state is to be one or more of a music-specific optimization state or a voice-specific optimization state.

Example 13 may include a method of operating a wearable device, comprising determining a usage configuration of the wearable device, setting an activation state of an air conduction speaker of the wearable device based at least in part on the usage configuration, and setting an activation state of a tissue conduction speaker of the wearable device based at least in part on the usage configuration.

Example 14 may include the method of Example 13, wherein the usage configuration is determined based on a set of status signals that indicate one or more of a physical position, a physical activity, a current activation state, an interpersonal proximity state or a manual user request associated with one or more of the air conduction speaker or the tissue conduction speaker.

Example 15 may include the method of Example 13, further including determining an attribute of an audio signal associated with the wearable device, wherein one or more of the activation state of the air conduction speaker or the activation state of the tissue conduction speaker are set further based on the attribute.

Example 16 may include the method of Example 13, wherein one or more of the activation state of the air conduction speaker or the activation state of the tissue conduction speaker are set further based on one or more of a power condition or an ambient noise condition associated with the wearable device.

Example 17 may include the method of any one of Examples 13 to 16, further including setting an optimization state of the tissue conduction speaker based on the usage configuration.

Example 18 may include the method of Example 17, wherein the optimization state is one or more of a music-specific optimization state or a voice-specific optimization state.

Example 19 may include at least one non-transitory computer readable storage medium comprising a set of instructions which, when executed by an apparatus, cause the apparatus to determine a usage configuration of a wearable device, set an activation state of an air conduction speaker of the wearable device based at least in part on the usage configuration, and set an activation state of a tissue conduction speaker of the wearable device based at least in part on the usage configuration.

Example 20 may include the at least one non-transitory computer readable storage medium of Example 19, wherein the usage configuration is to be determined based on a set of status signals that indicate one or more of a physical position, a physical activity, a current activation state, an interpersonal proximity state or a manual user request associated with one or more of the air conduction speaker or the tissue conduction speaker.

Example 21 may include the at least one non-transitory computer readable storage medium of Example 19, wherein the instructions, when executed, cause the apparatus to determine an attribute of an audio signal associated with the wearable device, wherein one or more of the activation state of the air conduction speaker or the activation state of the tissue conduction speaker are to be set further based on the attribute.

Example 22 may include the at least one non-transitory computer readable storage medium of Example 19, wherein one or more of the activation state of the air conduction speaker or the activation state of the tissue conduction speaker are to be set further based on one or more of a power condition or an ambient noise condition associated with the wearable device.

Example 23 may include the at least one non-transitory computer readable storage medium of any one of Examples 19 to 22, wherein the instructions, when executed, cause the apparatus to set an optimization state of the tissue conduction speaker based on the usage configuration.

Example 24 may include the at least one non-transitory computer readable storage medium of Example 23, wherein the optimization state is to be one or more of a music-specific optimization state or a voice-specific optimization state.

Example 25 may include an apparatus to operate a wearable device, comprising means for determining a usage configuration of the wearable device, means for setting an activation state of an air conduction speaker of the wearable device based at least in part on the usage configuration, and means for setting an activation state of a tissue conduction speaker of the wearable device based at least in part on the usage configuration.

Example 26 may include the apparatus of Example 25, wherein the usage configuration is to be determined based on a set of status signals that indicate one or more of a physical position, a physical activity, a current activation state, an interpersonal proximity state or a manual user request associated with one or more of the air conduction speaker or the tissue conduction speaker.

Example 27 may include the apparatus of Example 25, further including means for determining an attribute of an audio signal associated with the wearable device, wherein one or more of the activation state of the air conduction speaker or the activation state of the tissue conduction speaker are to be set further based on the attribute.

Example 28 may include the apparatus of Example 25, wherein one or more of the activation state of the air conduction speaker or the activation state of the tissue conduction speaker are to be set further based on one or more of a power condition or an ambient noise condition associated with the wearable device.

Example 29 may include the apparatus of any one of Examples 25 to 28, further including means for setting an optimization state of the tissue conduction speaker based on the usage configuration.

Example 30 may include the apparatus of Example 29, wherein the optimization state is to be one or more of a music-specific optimization state or a voice-specific optimization state.

Thus, techniques described herein may use pressure sensors embedded within ear buds to detect whether the ear buds are positioned in the ear canals and/or microphones to detect sound feedback that is indicative of the ear bud or ear can being near the skin. Additionally, a sound coordinator may accept input from a context determiner, sound sources, sensors, etc., and intelligently direct the sound output to various speakers (air and tissue conduction) worn on the body based on that input. Moreover, users may provide feedback or interact with the wearable device (e.g., via capacitive touch interface) in order to shift delivery of the audio signal/stream from one speaker to another. In another example, specific playlists may be compiled and tailored to the optimal audio characteristics for the speaker(s) in use (e.g., tissue conduction playlist versus air conduction playlist).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A wearable device comprising:
- an air conduction speaker;
- a tissue conduction speaker; and
- logic, implemented in one or more of configurable logic hardware or fixed-functionality logic hardware, to:
  - determine a usage configuration of the wearable device,
  - set an activation state of the air conduction speaker based at least in part on the usage configuration, and
  - set an activation state of the tissue conduction speaker based at least part on the usage configuration,
  - the wearable device further including one or more sensors, wherein the usage configuration is to be determined based on a set of status signals from the one or more sensors that indicate a physical position, a physical activity, a current activation state, an interpersonal proximity state and a manual user request associated with one or more of the air conduction speaker or the tissue conduction speaker.

2. The wearable device of claim 1, wherein the logic is to determine an attribute of an audio signal associated with the wearable device, wherein one or more of the activation state of the air conduction speaker or the activation state of the tissue conduction speaker are to be set further based on an attribute.

3. The wearable device of claim 1, wherein one or more of the activation state of the air conduction speaker or the activation state of the tissue conduction speaker are to be set further based on one or more of a power condition or an ambient noise condition associated with the wearable device.

4. The wearable device of claim 1, wherein the logic is to set an optimization state of the tissue conduction speaker based on the usage configuration.

5. The wearable device of claim 4, wherein the optimization state is to be one or more of a music-specific optimization state or a voice-specific optimization state.

6. An apparatus comprising:
- logic, implemented in one or more of configurable logic hardware or fixed-functionality logic hardware, to:
  - determine a usage configuration of a wearable device,
  - set an activation state of an air conduction speaker of the wearable device based at least in part on the usage configuration, and
  - set an activation state of a tissue conduction speaker of the wearable device based at least part on the usage configuration,
  - wherein the usage configuration is to be determined based on a set of status signals that indicate a physical position, a physical activity, a current activation state, an interpersonal proximity state and a manual user request associated with one or more of the air conduction speaker or the tissue conduction speaker.

7. The apparatus of claim 6, wherein the logic is to determine an attribute of an audio signal associated with the wearable device, wherein one or more of the activation state of the air conduction speaker or the activation state of the tissue conduction speaker are to be set further based on an attribute.

8. The apparatus of claim 6, wherein one or more of the activation state of the air conduction speaker or the activation state of the tissue conduction speaker are to be set further based on one or more of a power condition or an ambient noise condition associated with the wearable device.

9. The apparatus of claim 6, wherein the logic is to set an optimization state of the tissue conduction speaker based on the usage configuration.

10. The apparatus of claim 9, wherein the optimization state is to be one or more of a music-specific optimization state or a voice-specific optimization state.

11. A method comprising:
- determining a usage configuration of a wearable device;
- setting an activation state of an air conduction speaker of the wearable device based at least in part on the usage configuration; and
- setting an activation state of a tissue conduction speaker of the wearable device based at least in part on the usage configuration,
- wherein the usage configuration is determined based on a set of status signals that indicate a physical position, a physical activity, a current activation state, an interpersonal proximity state and a manual user request associated with one or more of the air conduction speaker or the tissue conduction speaker.

12. The method of claim 11, further including determining an attribute of an audio signal associated with the wearable device, wherein one or more of the activation state of the air conduction speaker or the activation state of the tissue conduction speaker are set further based on an attribute.

13. The method of claim 11, wherein one or more of the activation state of the air conduction speaker or the activation state of the tissue conduction speaker are set further based on one or more of a power condition or an ambient noise condition associated with the wearable device.

14. The method of claim 11, further including setting an optimization state of the tissue conduction speaker based on the usage configuration.

15. The method of claim 14, wherein the optimization state is one or more of a music-specific optimization state or a voice-specific optimization state.

16. At least one non-transitory computer readable storage medium comprising a set of instructions which, when executed by an apparatus, cause the apparatus to:
- determine a usage configuration of a wearable device;
- set an activation state of an air conduction speaker of the wearable device based at least in part on the usage configuration; and
- set an activation state of a tissue conduction speaker of the wearable device based at least in part on the usage configuration,
- wherein the usage configuration is to be determined based on a set of status signals that indicate a physical position, a physical activity, a current activation state, an interpersonal proximity state and a manual user request associated with one or more of the air conduction speaker or the tissue conduction speaker.

17. The at least one non-transitory computer readable storage medium of claim 16, wherein the instructions, when executed, cause the apparatus to determine an attribute of an audio signal associated with the wearable device, wherein one or more of the activation state of the air conduction speaker or the activation state of the tissue conduction speaker are to be set further based on an attribute.

18. The at least one non-transitory computer readable storage medium of claim 16, wherein one or more of the activation state of the air conduction speaker or the activation state of the tissue conduction speaker are to be set further based on one or more of a power condition or an ambient noise condition associated with the wearable device.

19. The at least one non-transitory computer readable storage medium of claim 16, wherein the instructions, when executed, cause the apparatus to set an optimization state of the tissue conduction speaker based on the usage configuration.

20. The at least one non-transitory computer readable storage medium of claim 19, wherein the optimization state is to be one or more of a music-specific optimization state or a voice-specific optimization state.

21. A wearable device comprising:

an air conduction speaker;

a tissue conduction speaker; and logic, implemented at least partly in one or more of configurable logic hardware or fixed-functionality logic hardware, to:

determine a usage configuration of the wearable device, set an activation state of the air conduction speaker based at least in part on the usage configuration, and set an activation state of the tissue conduction speaker based at least part on the usage configuration, the wearable device further including one or more sensors, wherein the usage configuration is to be determined based on a set of status signals from the one or more sensors that indicate at least an interpersonal proximity state associated with one or more of the air conduction speaker or the tissue conduction speaker.

22. The wearable device of claim 1, wherein the interpersonal proximity state is to be related to a proximity to another individual or another device.

* * * * *